(12) United States Patent
Maze et al.

(10) Patent No.: US 8,792,368 B2
(45) Date of Patent: Jul. 29, 2014

(54) METHOD AND DEVICE FOR COMPUTING THE AVAILABLE SPACE IN A PACKET FOR DATA STREAM TRANSPORT

(75) Inventors: Frédéric Maze, Langan (FR); Eric Nassor, Thorigne Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 614 days.

(21) Appl. No.: 13/016,651

(22) Filed: Jan. 28, 2011

(65) Prior Publication Data

US 2011/0194439 A1 Aug. 11, 2011

(30) Foreign Application Priority Data

Feb. 9, 2010 (FR) .................................. 10 50892

(51) Int. Cl.
*G01R 31/08* (2006.01)
(52) U.S. Cl.
USPC ....................................................... 370/252
(58) Field of Classification Search
USPC ......... 370/203, 204–215, 229–240, 310–394, 370/395.1, 395.3, 395.4, 395.41, 395.42, 370/395.5, 395.52, 395.53, 412–421, 370/431–529, 523–520
See application file for complete search history.

(56) References Cited

U.S. PATENT DOCUMENTS

2004/0223551 A1\* 11/2004 Hannuksela ............. 375/240.25
2006/0193350 A1\* 8/2006 Chen .............................. 370/537
2009/0028142 A1\* 1/2009 Schmidt et al. ............... 370/389

FOREIGN PATENT DOCUMENTS

EP 1 553 738 7/2005

OTHER PUBLICATIONS

"TCP Friendly Rate Control (TFRC): Protocol Specification", IETF, RFC 5348, Sep. 2008.
"RTP with TCP Friendly Rate Control", IETF, draft, Jul. 2007.
Schwaderer, C., "A driver-based approach to protocol stack design", Sep. 1999.
"RTP Retransmission Payload Format", RFC 4588, Jul. 2006.
Adam Dunkels, "Full TCP/IP for 8-bit architectures", Swedish Institute of Computer Science, published in proceedings of MobySys 2003, May 2003.
Extended RTP Profile for Real-time Transport Control protocol (RTCP)-Based Feedback (RTP/AVPF), RFC 4585, Jul. 2006.
"RTP Payload Format for Generic Forward Error Correction", RFC 5109, Dec. 2007.

(Continued)

*Primary Examiner* — Jung-Jen Liu
(74) *Attorney, Agent, or Firm* — Fitzpatrick, Cella, Harper & Scinto

(57) ABSTRACT

The method of computing the available space in a packet for data stream transport comprises:
a step of determining the requirements of each module of a data stream manager, for space in the packet for at least two types of header and/or extension data required by each protocol and/or service used by said module,
a step of determining a maximum space requirement in the packet to meet all these requirements, by implementing different rules for combining space requirements for the different types of data and a sum of the combined requirements for the different types of data and
a step of computing a difference between the space of the packet and the maximum space requirement in the packet in order to determine the available space for data stream transport.

14 Claims, 11 Drawing Sheets

(56) References Cited

OTHER PUBLICATIONS

"RTP Payload Format for MPEG-4 Audio/Visual Streams", RFC 3016, Nov. 2000.
"RTP Payload Format for H.264 Video", RFC 3984, Feb. 2005.
"RTP A Transport Protocol for Real-Time Applications", RFC 3550, Jul. 2003.
"A General Mechanism for RTP header Extensions", RFC 5285, Jul. 2008.
Curt Schwaderer, "A driver-based approach to protocol stack design", Embedded Systems Programming, Sep. 30, 1999, pp. 63-72. <URL:http://www.eetindia.co.in/ARTICLES/1999SEP/PDF/EEIOL_1999SEP04_EMS_NETD_TA.pdf>.
French Search Report dated Sep. 16, 2010 issued during prosecution of related French application No. FR 1050892.

* cited by examiner

METHOD AND DEVICE FOR COMPUTING THE AVAILABLE SPACE IN A PACKET FOR DATA STREAM TRANSPORT

REFERENCE TO PRIORITY APPLICATION

The present application claims priority of French patent application No. 1050892 filed on Feb. 9, 2010, which is incorporated herein by reference.

FIELD OF THE INVENTION

The present invention concerns a method and a device for computing the available space in a packet for data stream transport. The invention applies, in particular, to forming packets ("packetization") of payload data, in particular multimedia data, and, more particularly, to computing the available space in a network packet for placing payload data therein.

BACKGROUND OF THE INVENTION

The technical field of the invention is that of networks for packet communication and for the transport of multimedia data (audio, video, text) in those networks such as the Internet or local networks of IP ("Internet Protocol") type.

In the context of the transmission of multimedia data streams over the Internet or over LANs (acronym for "local area network"), a multimedia data server must deliver one or more data streams (of video type, audio type, text type, for example sub-titles, etc.) to one or more clients simultaneously. These clients receive and exploit those data progressively with their reception. For example, the client displays the video and plays the audio progressively as it receives them. This is then referred to as "multimedia streaming".

Generally, the data constituting these multimedia streams (video, audio, text) may be stored and, possibly, be compressed in advance on the data server (e.g. a multimedia hard disk) or on the contrary be captured and then, possibly, be compressed while streaming (for example in the case of network cameras). These data are then cut up into several pieces of payload data which are packetized by adding a variable number of headers or extensions. These headers and extensions contain in particular checking information associated with the different protocol layers or with the services used. They thus form packets able to be transported to their recipients across the networks. An example of a protocol adapted to the transport of multimedia data streams is RTP (acronym for "Real-time Transport Protocol") above UDP/IP protocols (UDP being an acronym for "User Datagram Protocol").

For reasons of efficiency, while avoiding fragmentation of packets by lower protocol layers, these RTP network packets generally have a maximum useful size set by the transport protocol used on the physical network. For example, on a network of "Ethernet" type, the maximum useful size of a packet is generally limited to 1500 bytes. This maximum useful size is shared between the payload data and the set of data headers required by the various protocol layers. For example, after addition of the UDP/IP headers, an RTP packet is thus limited to 1472 bytes.

In order to maximize the useful rate of the network from the point of view of the application, it is important for the payload data to be divided up so as to occupy the greatest possible space in a network packet. The dividing up of the multimedia streams into pieces of payload data may be adapted dynamically, either at encoding, or at packetization. The adaptation at the encoder is possible when the compression is carried out while streaming by modifying, for example, the size of the image portions ("slices") or audio portions ("samples"). The adaptation at packetization is possible when the latter enables several pieces of payload data to be fragmented or combined in the same network packet (for example as with the "H.264" packetization).

Once they have been divided up, a technique, known to the person skilled in the art, consists of placing the payload data in a buffer memory directly at the right place while leaving sufficient space at the buffer memory beginning to be able to add therein, subsequently, all the headers. The headers are thus added progressively by the various protocol layers without having to copy or move the payload data. This technique is thus efficient in terms of memory resource and processor resource.

The problem is to determine the available size in a network packet for the payload data and the location in the buffer memory starting from where the data should be placed.

Moreover, the server may send the same multimedia data streams to several clients at the same time. For example in multi-unicast, a different unicast communication is established between each client and the server. Each network packet is thus sent sequentially to each of the clients. In this case, the same item of payload data is sent to several different clients and only the headers are adapted to each client. To determine the size of the payload data, account is taken of the header constraints of each of the clients in order for an item of payload data to be sent to all the clients without being moved in memory.

Furthermore, each client may negotiate the use of different services (congestion control service, transmission error correction service based for example either on a retransmission mechanism or on a data redundancy mechanism, for example). These services may require the creation of data substream dependent on the original data stream (for example a retransmission or redundancy data stream in addition to the original stream). These services may also require the addition of supplementary information in header form either in the original stream or in the data substream or in both at the same time. For example, in the case of a retransmission, in case of loss of a packet from the main stream, the lost packet must be resent in an associated stream (which will be designated as a substream). As described in RFC 4588 ("RTP Retransmission Payload Format", IETF, RFC 4588, July 2006) describing the retransmission mechanism over RTP, a header of two supplementary bytes must also be added to the original payload data to describe the sequence number of the lost original packet. It is thus necessary to provide for this possibility as of the time of dividing up the multimedia data into pieces. In the opposite case, it is possible that the item of multimedia data may not be resent due to lack of space in the network packet.

Furthermore, some of this supplementary information may present a persistent character from one stream to another substream, that is to say that it must be repeated both in the original stream and the associated substream or on the contrary may have a local character (dependent on the stream). In this second case, it is not necessary to repeat them from one stream to a substream. These constraints must also be taken into account to determine the size available for the payload data such that they may be sent to all the clients, stream and substream without requiring fragmentation or memory copying.

It is thus particularly complex to determine at any time the optimum size of the payload data to place in the buffer memories in order to be able to be sent to all the clients in the most efficient way in terms of memory and processor resource and as appropriate for the different services used by each of the clients The paper "A driver-based approach to protocol stack design" (by Curt Schwaderer, Microware Systems Corp., published in Electronic Engineering Times-India (www.eet-india.co.in) in September 1999) is known which describes an approach enabling network protocol stacks to be designed while improving their efficiency. It proposes that a network services module determine the maximum size of the information to be added at the header and trailer of the network packets by interrogating each of the modules constituting the protocol stack. It performs this operation on creation and at each change of the protocol stack. Thus, when the application sends a message (for example "hello world"), the module of network services may directly allocate two buffer memories that are sufficiently large to contain all the information added respectively at packet headers and trailers by each of the modules constituting the protocol stack. All these modules have to do is then to add their information to those buffer memories without having to make any new memory allocation or copy. The approach described in this paper does not enable different types of headers (persistent or local) to be managed, the presence of data substreams or of several recipients for the same set of payload data.

The article "Full TCP/IP for 8-bit architectures" (by Adam Dunkels, Swedish Institute of Computer Science) published in Proceedings of MobiSys 2003, May 2003 is also known. This paper describes the implementation of two TCP/IP protocol stacks that are adapted, in terms of code size and memory consumption, to operate on 8-bit and 16-bit hardware platforms. It describes in particular in section 5 how the management of the memory and of the buffer memories has been optimized so as to require only a few kilo-bytes of RAM. In particular:

the network packets are placed in buffer memories of fixed size. The size is determined by a configuration option on compilation.

the buffer memories contain sufficient space for the TCP/IP protocol stack to be able to add the packet header information before the payload data, the latter being placed directly at the right place in the buffer memories to avoid later copying and each buffer memory contains a reference counter. This is incremented each time a new reference to the buffer memory is created by a module and decremented each time that reference is freed. The buffer memory as such is only freed once its reference counter has attained the value "0". The reference counter thus makes it possible to limit the number of copies from the buffer memory.

This implementation cannot manage headers of which the size varies depending on the services actually activated by the various recipients or the presence of data substreams.

The patent application US 2009/0028142 "Streaming Data Content In A Network" (of Brian K. Schmidt et al., July 2007) is also known, which describes a system for transmitting encoded data streams in which the generation of the data streams includes the generation of summary information. The summary information is then associated with each of the network packets as a complement to the data themselves. This summary information then enables the receiver of the network packets to process, at least in part, the received packets without having to decode them fully. The summary information is of fixed size and is inserted in each of the packets in the form of one or more headers situated between the RTP header and the payload data. The available space in a network packet is evaluated for the payload data as being the maximum size of the UDP network packet (1472 bytes) less the size of the RTP header (12 bytes) less the size of the summary information (for example a fixed size of 88 bytes). This system does not enable the size of the payload data that is available in a network packet to be managed dynamically according to the services actually activated by the various recipients or the presence of data substreams.

SUMMARY OF THE INVENTION

The present invention aims to mitigate these drawbacks.

To that end, according to a first aspect, the present invention concerns a method of computing the available space in a packet for data stream transport, which comprises:

a step of determining the requirements of each module of a data stream manager, for space in the packet for at least two types of header and/or extension data required by each protocol and/or service used by said module, a step of determining a maximum space requirement in the packet to meet all these requirements, by implementing different rules for combining space requirements for the different types of data and a sum of the combined requirements for the different types of data and a step of computing a difference between the space of the packet and the maximum space requirement in the packet in order to determine the available space for data stream transport.

The invention thus makes it possible to manage different types of additional information added to the payload data on generation of a network packet. For example, the payload headers of persistent or data stream dependent type, the Basic RTP header extensions of persistent or purely data stream dependent type and the headers of fixed size (for example, the Basic RTP headers).

By virtue of the implementation of the present invention, it is no longer necessary to duplicate/copy the data from the stream, for example the payload data, even if they are sent to several recipients (multi-unicast case) or if they are to be resent several times to the same client. The system thus consumes less memory resource and less processor resource.

According to particular features, the method of the present invention comprises:

a step of detecting an event from among the following:
    arrival of a recipient client of the data stream in a network for transmitting said data stream,
    departure of a recipient client of the data stream from the network,
    activation of at least one module of the data stream manager, and
    deactivation of at least one module of the data stream manager; and a step of determining the data stream manager concerned by said event, said data stream manager performing the steps of determining requirements and of computing.

Thus, the size available for the data of the data stream in a network packet is always optimum. It is re-estimated each time a client connects or disconnects to or from the system and on each activation or deactivation of a service by one of the clients.

According to particular features, during the step of determining the requirements of each module for space in the packet for at least two types of data, the types comprise at least one persistent extension type and at least one data stream dependent extension type.

According to particular features, during the step of determining the requirements of each module for space in the packet for at least two types of data, the types comprise:

at least one of the following types:
    persistent RTP header extension (PHE) and
    persistent payload data extension (PPE), and
at least one of the following types:
    data stream dependent RTP header extension (SDHE) and
    data stream dependent payload data extension (SDPE).

According to particular features, during the step of determining a maximum space requirement in the packet to meet all these requirements, there is implemented:

for the combination of persistent extension type space requirements, a requirement adding operation and, for the combination of space requirements of data stream dependent type, a maximum requirement value extracting operation.

According to particular features, during the step of determining the requirements of each module, if said module is a source of a substream of the data stream, the space requirement of the packet is determined for at least two types of data of the substream.

According to particular features, during the step of determining a maximum space requirement in the packet to meet all the requirements, for all the substreams of said data stream, an operation is implemented of extracting the maximum value of the requirements for the substreams for each type of data.

According to particular features, during the step of determining a maximum space requirement in the packet to meet all the requirements R, the following equations are implemented for the set of the modules $M_i$ which compose the manager of stream S and substreams Sj inherited by the stream manager:

for the persistent header extensions PHE:

$$R^{PHE}(S) = \sum_{i}^{\substack{processing \\ modules}} R^{PHE}(M_i) + \max_{j}^{substream}(R^{PHE}(S_j))$$

for the data stream dependent header extensions SDHE:

$$R^{SDHE}(S) = \max\left(\sum_{i}^{\substack{processing \\ modules}} R^{SDHE}(M_i), \max_{j}^{substream}(R^{SDHE}(S_j))\right)$$

for the persistent payload data extensions PPE $$R^{PPE}(S) = \sum_{i}^{\substack{processing \\ modules}} R^{PPE}(M_i) + \max_{j}^{substream}(R^{PPE}(S_j))$$

and for the data stream dependent payload data extensions SDPE.

$$R^{SDPE}(S) = \max\left(\sum_{i}^{\substack{processing \\ modules}} R^{SDPE}(M_i), \max_{j}^{substream}(R^{SDPE}(S_j))\right)$$

next, to compute the total requirement $R^E(S)$, $$R^E(S) = O^E\left(\sum_{M_i}^{\substack{processing \\ modules}} R^E(M_i), \max_{S_j}^{substream}(R^E(S_j))\right)$$

in which equation "E" designates the type of extension information, that is to say one of the types PHE, SDHE, PPE or SDPE, and $O^E$ designates an operation dependent on the type E with:

$O^{SDHE}$ and $O^{SDPE}$ corresponding to the operation "max" which extracts the maximum value of a pair of values and $O^{PHE}$ and $O^{PPE}$ correspond to the operation "+" which adds the values of the pair of values.

According to particular features, the method of the present invention further comprises a step of reserving packet space at a buffer memory factory linked to the source of the stream considered, by indicating the result of the difference computing step, and a step of computing, by the factory, the maximum of the requests for space reservation so as to yield a buffer memory, on request for a new buffer memory for placing therein new data from the stream, with a pointer to the location starting from which the data from the stream may be placed as a function of the maximum of the requests for reservation of space at the buffer memory beginning.

According to particular features, the method of the present invention comprises, for each item of data of the data stream:

a single step of writing said item of data in the buffer memory, after said pointer and, for each transmission of said item of data to a recipient, a step of writing header and/or extension data for each module of the data stream manager that is associated with said transmission.

Thus the payload data are not copied or moved to be sent to different recipients, in response to a request for retransmission or at the time of the addition of error correcting data.

The method may thus also comprise a step of transmitting a first packet including data from the stream and a header and/or extension data according to one of said two types, as well as possibly a step of transmitting a second packet including said data from the stream and a header and/or extension data according to the other one of said two types.

According to particular features, the method of the present invention comprises a step of transmitting data from the stream according to RTP ("Real-time Transport Protocol").

According to a second aspect, the present invention concerns a device for computing the available space in a packet for data stream transport, which comprises:

a means for determining the requirements of each module of a data stream manager, for space in the packet for at least two types of header and/or extension data required by each protocol and/or service used by said module, a means for determining a maximum space requirement in the packet to meet all these requirements, by implementing different rules for combining space requirements for the different types of data and a sum of the combined requirements for the different types of data and a means for computing a difference between the space of the packet and the maximum space requirement in the packet in order to determine the available space for data stream transport.

According to a third aspect, the present invention concerns a computer program loadable into a computer system, said program containing instructions enabling the implementation of the method of the present invention, as succinctly set forth above.

According to a fourth aspect, the present invention concerns an information carrier readable by a computer or a microprocessor, removable or not, storing instructions of a computer program, characterized in that it enables the implementation of the method of the present invention, as succinctly set forth above.

As the particular advantages, objects and features of this device, of this program and of this information carrier are similar to those of the methods of the present invention, they are not reviewed here.

BRIEF DESCRIPTION OF THE DRAWINGS

Other advantages, objects and features of the present invention will emerge from the following description, given with an explanatory purpose that is in no way limiting, with respect to the accompanying drawings, in which.

DETAILED DESCRIPTION OF PREFERRED EMBODIMENTS

In the whole of the description, the following definitions are used:

"Buffer memory": a buffer memory, commonly designated by the term "buffer" is an area of random access memory or disk used for temporarily storing data, in particular between two processes of items of equipment not working at the same rate;

"Packetization": action of grouping the stream of bits to transport together into packets. A certain number of items of information is added, in header form for example, to indicate to whom belongs the packet and to whom it is addressed;

"RFC" (acronym for "requests for comment"): literally, this is a request for comments, and more generally, a numbered series of electronic documents documenting the technical aspects of the Internet. Few RFCs are standards, but all Internet standards are RFCs.

Schematically, at each event (departure/arrival to or from a client or at each activation/deactivation of a service by a client), each of the data stream managers concerned by the event determines the maximum space which it will require in a network packet to place therein the headers and the extensions required by the protocols and services used. For this each module constituting the data stream manager is interrogated and communicates its memory space requirements, differentiating them into several types. On packetization of the payload data, each module may thus add extension information corresponding to the following types:

persistent RTP header extension (PHE),
RTP header extension dependent on the data stream (SDHE),
persistent payload data extension (PPE) and
data stream dependent payload data extension (SDPE).

If a module is itself at the origin of a substream, it recursively determines the requirements for memory space linked to that substream.

The different types of memory requirements expressed by each of the modules constituting the data stream manager are next combined and the maximum reserved memory space is determined for the data stream manager as a whole. The specific operations of combination are dependent here on the type of information to combine.

The stream manager next records its reserved space requirement with a "buffer factory" linked to the source of payload data. This factory maintains the list of the memory space reservation requests of each of the stream managers which are linked to it and thus computes the maximum of the memory space reservation requests. When the encoder or packetizer requests a new buffer memory from the factory, to place therein new payload data, the factory gives them back the buffer memory with a pointer to the location starting from which the payload data may be placed taking into account the maximum of the spaces reserved at the beginning of the buffer memory for all the data stream managers linked to the payload data source.

Figure 1:
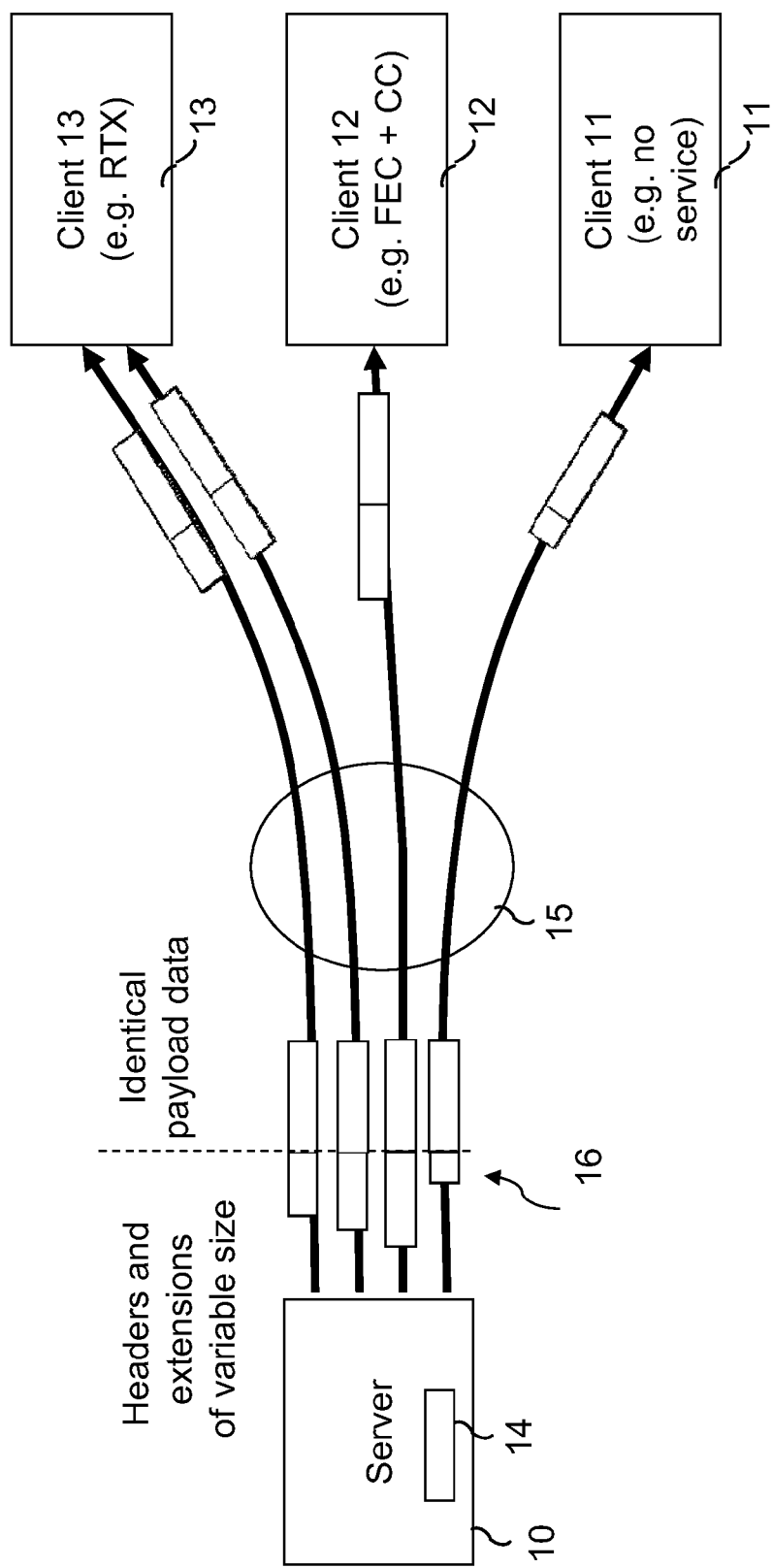
FIG. 1 is a diagrammatic representation of a case of use of the present invention.

As illustrated in FIG. 1, in a case of use of the present invention, a sender device or server 10 transmits packets 16 of payload data 14 from the same multimedia data stream 14 to several receiver devices or clients 11, 12 and 13 via a data communication network 15. For example, the server 10 may retransmit the multimedia streams (video and/or audio) captured by a camera. The communication network 15 is, for example, a wireless network (for example WiFi/802.11a/b/g/n), or a local Ethernet network, or a long-distance network such as the Internet.

The payload data 14 are sent using protocols adapted for real-time transmission of data such as RTP ("Real-time Transport Protocol"). This protocol is typically implemented above a UDP/IP protocol. Furthermore, the receiver device may provide feedback information to the sender device, for example using the RTCP control protocol possibly extended using the AVPF profile (AVPF being an acronym for "Audio-Visual Profile with Feedbacks" described in RFC 4585 ("Extended RTP Profile for Real-time Transport Control Protocol (RTCP)-Based Feedback (RTP/AVPF)", IETF, RFC 4585, July 2006)).

Each network packet 16 contains both payload data 14 and protocol headers and possibly also extensions of those protocol headers and/or extensions to the payload data which depend on the services implemented by each server-client pair. For example, the client 13 uses a retransmission service (RTX) as described in RFC 4588 ("RTP Retransmission Payload Format", IETF, RFC 4588, July 2006). If a network packet is lost, the payload data may be resent at the client's request. In this case, according to the RFC, the packet containing the payload data also comprises, in addition to the usual headers, a small extension to the payload data of two bytes containing the sequence number of the corresponding lost packet.

In another example, the client 12 uses error correction services (or "FEC" from Forward Error Correction) as described in RFC 5109 ("RTP Payload Format for Generic Forward Error Correction", IETF, RFC 5109, December 2007) as well as a congestion control (CC) service such as TFRC ("TCP Friendly Rate Control (TFRC): Protocol Specification", IETF, RFC 5348, September 2008). As for the retransmission service, the error correction service (FEC) requires the addition of additional redundancy information to the packets and the congestion control service may require the addition of extensions to the RTP headers. Thus for the same item of payload data sent to each of the clients, the network packets 16 may contain headers and extensions of variable size.

Figure 2:
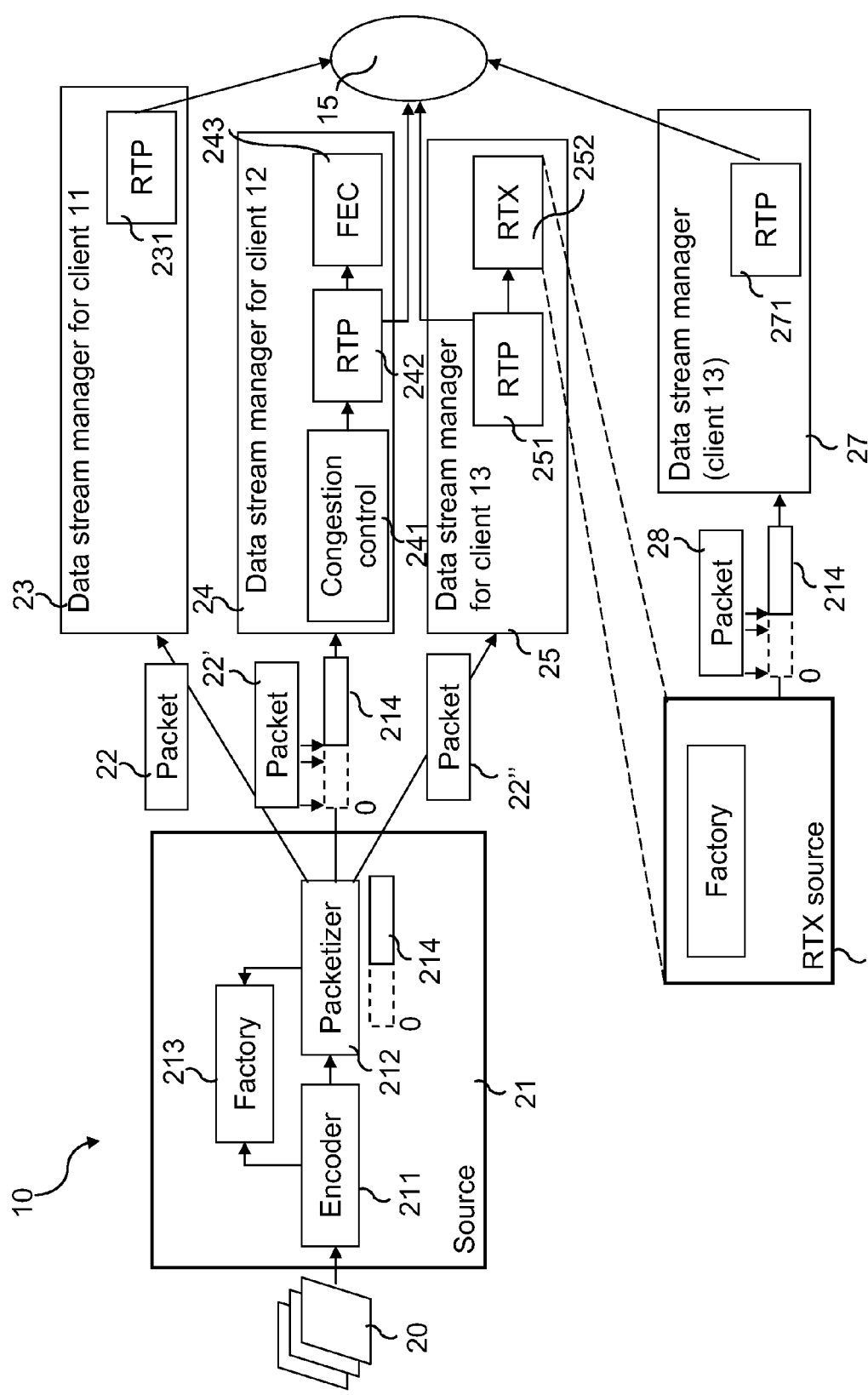
FIG. 2 represents, in the form of a block diagram, a particular embodiment of a device of the present invention.

Below the situation is considered of the case of transmitting a video stream encoded while streaming, but the case of transmitting a pre-encoded video stream or an audio stream could be dealt with by the person skilled in the art in an entirely similar way (In the case of pre-encoded data, the encoder 211 described with reference to FIG. 2 may be replaced by a reader of pre-encoded data). In FIG. 2, the block diagram describes a multimedia stream server 10.

Generally, the raw data (image frames) to be sent 20 are processed by a source block 21. The source block 21 has the task of processing them to obtain payload data which will be placed in a series of buffer memories 214. Each buffer memory 214 is then sequentially processed via a data stream manager 23, 24, 25 and 27 corresponding to a network recipient identified by a different "IP address/port number" combination (respectively named client1, client2 and client3). It may be a case of a unicast and/or multicast IP address.

Each data stream manager has the task of transforming the payload data from a buffer memory 214 into a valid RTP packet by adding additional information, headers and, possibly, payload data extension information in order for that packet to be sent to its recipient by the communication network 15. Before being able to be manipulated by a data stream manager, the content of the buffer memory 214 is associated in memory with an object describing a virtual RTP packet (for example 22, 22', 22" or 28) given the task of describing the content of the buffer memory 214 for a particular data stream manager.

The virtual RTP packets 22, 22', 22" and 28 contain in particular pointers to the buffer memory 214 designating the location of the payload data and of certain headers and extensions to the payload data present in the buffer memory 214. Each data stream manager is constituted by one or more processing modules (for example 231, 241, 242, 243, 251, 252 and 271). It is possible for each processing module (or handler) to make complementary addition to the content of the buffer memory 214 by adding to it additional data headers or to keep, for later use, a reference to the virtual RTP packet (22, 22', 22" or 28) (and thus by extension to the associated buffer memory 214).

Among the processing modules, there is a particular processing module, the RTP module 231, 242, 251 and 271, which is given the task of finalizing an RTP packet by adding the RTP protocol header to the content of a buffer memory 214 and of transmitting that RTP packet, thus formed in memory, to its recipient via the communication network 15.

In more detail, the source block 21 is constituted by an encoder 211, a packetizer 212 adapted to the encoding format and a buffer memory "factory" 213. The data 20 are composed of image frames which come, for example, from a capture peripheral such as a video camera. These data are supplied at the frequency corresponding to the sampling frequency of the capture peripheral. These image frames are encoded by the encoder 211 into a video compression format, for example MPEG4 or H.264/AVC. The packetizer 212 segments and/or re-organizes the data thus encoded to form pieces of payload data which are adapted to be sent in network packets. The packetization of the encoded data may be carried out as described in "RTP Payload Format for MPEG-4 Audio/Visual Streams" IETF November 2000, for the MPEG4 format, or "RTP Payload Format for H.264 Video", IETF, RFC 3984, February 2005, for the H.264 format.

The encoder 211 and/or the packetizer 212 interrogate the buffer memory factory 213 to know the maximum size available for the payload data in a network packet. With the reply, they respectively adapt the encoding and/or the packetization to obtain a size of payload data which is the closest possible to the maximum size. For example, the encoding may be adapted by modifying the image portions ("slices") or the quantization step size. The packetization may be adapted by fragmenting or by combining the image portions, if the packetization mode allows this.

The payload data generated by the encoder/packetizer pair are placed in a buffer memory 214. This buffer memory 214 is allocated in advance by the buffer memories factory 213 at the request of the encoder 211 or of the packetizer 212.

The buffer memory factory 213 continuously keeps all the requests for reservation of memory space for each of the data stream managers linked to the source 21 (For example 23, 24 and 25) The buffer memory factory 213 thus determines the maximum memory space which must be reserved at the beginning of network packets. With this information, the payload data are positioned directly at the right place in the buffer memory 214. The space left free at the buffer memory beginning 214 (in dashed line in FIG. 2) enables each processing module to add, subsequently, the header and extension information without having to copy or move the payload data in memory.

It is assumed that the same item of payload data is to be sent to the clients 11, 12 and 13. For this, the buffer memory 214 is treated sequentially by each of the data stream managers 23, 24 and 25. For each of the data stream managers, a different virtual "RTP packet" object 22, 22' and 22" is created.

These objects contain in particular several pointers to the buffer memory 214 enabling its content to be designated.
 a pointer to the beginning of the buffer memory,
 a pointer to the location of the payload data and
 a pointer to the location of the header extensions.

Initially, the last two pointers of each RTP packet 22, 22', 22" are equal and designate the location of the payload data in the buffer memory 214 as placed by the source 21.

Each data stream manager 23, 24 and 25 is composed of at least one processing module. These processing modules are given the task of processing the buffer memory 214 and the associated virtual "RTP packet" object (22, 22' or 22"). Each data stream manager 23, 24, 25 consecutively manipulates the same buffer memory 214 (it being possible for the zone in dashed line in front of the payload data to be re-written by each of the stream managers). Thus the payload data are not copied or moved in memory when they are sent to several clients.

For example, the data stream manager 23 associated with the client 11 is only composed of one RTP processing module 231 The RTP processing module takes on the task of placing the 12 bytes of the RTP header in front of the payload data in the buffer memory 214 using the pointers of the virtual RTP packet 22 and sends the packet so formed in memory, over the communication network 15. After the sending over the network, the virtual RTP packet 22 may be destroyed.

Next, the same payload data from the buffer memory 214 are sent to the client 12 using the data stream manager 24. The data stream manager 24 associated with the client 12 is, for example, composed of three module: a congestion control module 241, an RTP module 242 (similar to module 231) and an error correction module based on data redundancy 243 (or "FEC" from "forward error correction"). In this example, the congestion control module 241 may insert additional information in the buffer memory 214 in the form of extensions to the RTP headers (for example to be able to compute the round-trip time (or "RTT") for a packet. This information is place in front of the payload data and the pointers of the virtual RTP packet 22' are repositioned in consequence.

The virtual RTP packet 22' and the buffer memory 214 are next processed by the RTP module 242 which finalizes the RTP packet in the buffer memory 214 and sends it over the communication network 15. The virtual RTP packet 22' and the buffer memory 214 are then processed by the FEC module 243. The FEC module 243 has to store several RTP packets before being able to compute a new redundancy packet. The FEC module 243 thus keeps a reference to the virtual RTP packet 22'. It is to be noted that only the payload data from the buffer memory 214 pointed to by the virtual packet 22' are exploitable to compute a redundancy packet. The header information and extensions placed in the buffer memory 214 by the module 241 and 242 are liable to be overwritten on sending the same payload data by other data stream managers.

If necessary, the virtual packet 22' referenced by the module 243 thus keeps sufficient information to regenerate the headers and extensions as they were at the time of the initial sending by the module 242.

After processing by the data stream manager 24, the buffer memory 214 is finally dealt with by the data stream manager 25 in order for its content to be sent to the client 13. A new virtual RTP packet 22" is allocated. This virtual RTP packet 22" references the buffer memory 214. The data stream manager 25 associated with the client 13 is here composed if two module: an RTP module 251 (similar to the module 231 and 242) and an error correction module based on retransmissions ("RTX") 252. As for the FEC module 243, the RTX module 252 may keep a reference to the RTP packet 22". In particular, it keeps a reference to the RTP packet 22" for a predetermined time to be able to retransmit it over the network at the client's request.

The RTX module 252 behaves both as a processing module in a data stream manager as described above, and as a new source of RTP packets 26 for the sending of retransmitted packets. The RTX processing module 252 and the RTX source 26 are thus two aspects of the same RTX module. When the server 10 receives a request from the client 13 for retransmission, this request for retransmission is sent to the RTX source 26. The RTX source 26 searches among the packets stored by the RTX module 252 for the RTP packet 22" and its associated buffer memory 214 corresponding to the request for retransmission. If the packet is found, it allocates a new virtual RTP packet 28 which will describe the resent packet. This new virtual RTP packet 28 references the same buffer memory 214 as the original virtual RTP packet 22".

Thus, the payload data are not copied or moved at the time of the response to a retransmit request. Only the part in dashed line corresponding to the headers and extensions is re-written on sending the packet by the retransmission data stream manager 27. This data stream manager 27 associated with the RTX source 26 operates in similar manner to the other data stream managers 23, 24, 25. It is composed here of an RTP processing module 271 which places the RTP headers in front of the payload data and sends the network packet so formed to the client 13.

It is noted that the FEC processing module 243 is itself a source of data which is similar to that described for the RTX module 252 for the sending of the FEC redundancy packets generated from the original RTP packets 22'. This FEC redundancy source has not been represented in FIG. 2, for reasons of clarity (see representation of the FEC source in FIGS. 7 and 8).

It is also to be noted that the re-writing of the header zone in a buffer memory 214 to place therein additional information and headers that are specific to a client is possible due to the fact that each data stream and substream is processed sequentially.

Figure 3:
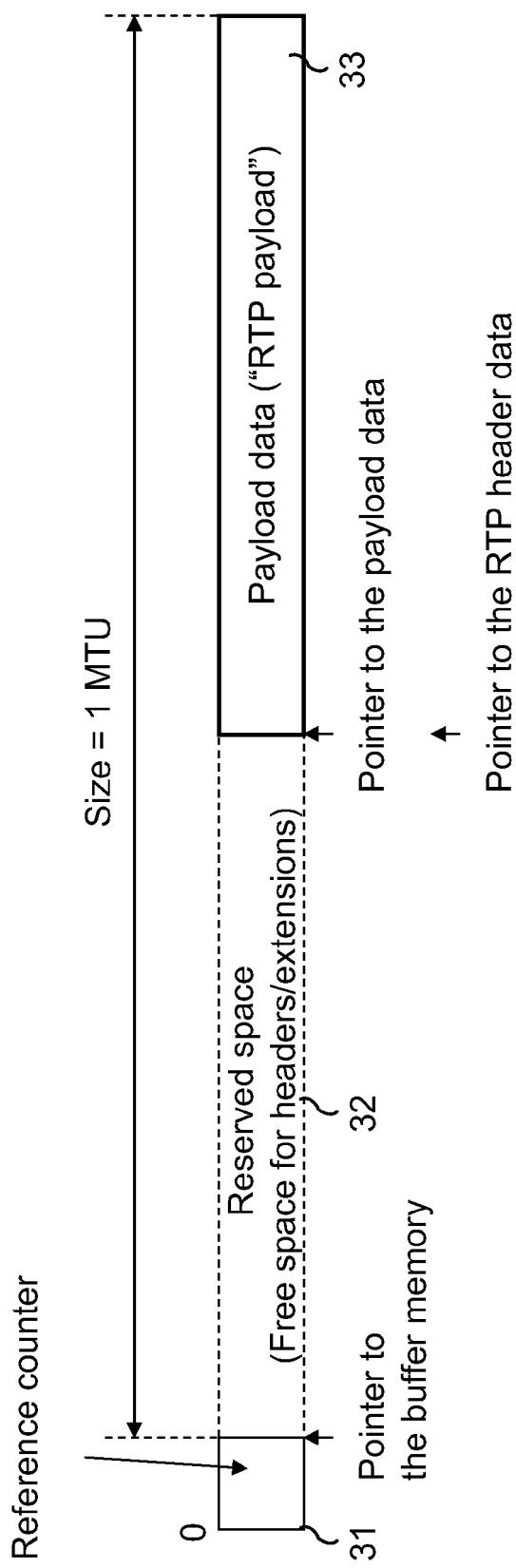
FIG. 3 is a diagram of the content of a buffer memory for the implementation of a particular embodiment of the method of the present invention.

FIG. 3 describes the content of a buffer memory 214, as allocated by a buffer memory factory for the sending of a new network packet.

A buffer memory employed to implement the present invention is preferably a contiguous block of memory constituted by several parts. At the head of the buffer memory is a reference counter 31. This counter 31 is incremented each time the buffer memory is referenced by another object, for example an RTP virtual packet, a processing module or a data source. This counter 31 is decremented each time an object drops the reference it has to the buffer memory. When the reference counter 31 attains the value "0", that is to say that it is no longer referenced by any object of the system, the buffer memory is de-allocated.

After the reference counter 31 there is situated a reserved space 32 which may be used by the different processing modules for adding header and/or extension information to the payload data so as to manufacture a data packet able to be transported over the network. The computation of the maximum size of this reserved space is described later.

After this reserved space 32 is situated a zone 33 available to place therein the payload data obtained by the encoder-packetizer pair. The size of the payload data actually placed in that zone 33 may be less than or equal to the size of that zone 33.

When a buffer memory is allocated by a buffer memory factory, that factory determines the size of the reserved space 32 as being the maximum of the reservation requests made by the different data stream managers associated with the source. The remaining space is allocated to the payload data and constitutes the zone 33. The buffer memory factory yields to the encoder/packetizer the buffer memory allocated with several pointers enabling the different zones to be defined.

a pointer to the buffer memory designating the beginning of the reserved space,
  a pointer to the payload data designating the location starting from which the payload data may be placed and
  a pointer to the RTP header extensions placed initially at the same place as the pointer to the payload data.

The total size of a buffer memory corresponds to the maximum size (in bytes) of the packet able to be resent at a single time (without fragmentation) over the network (or "MTU" for "maximum transmission unit") plus the size of the reference counter 31.

Figure 4:
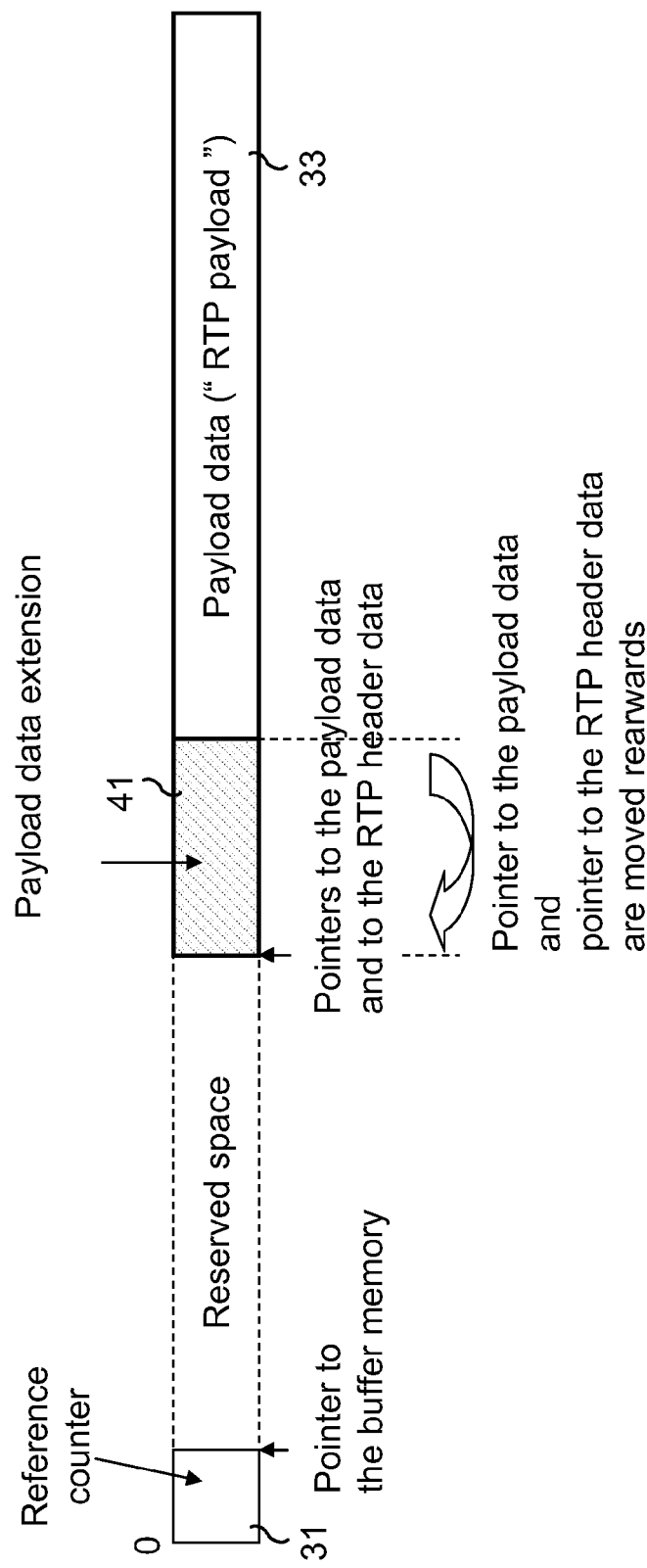
FIG. 4 is a diagram of the content of a buffer memory with a payload data extension that has been added relative to the content presented in FIG. 3.

FIG. 4 describes the addition of a payload data extension. When a processing module or a source adds a payload data extension 41 to a buffer memory, the size of the additional information is subtracted from the payload data pointer and that additional information is placed at the location designated by that pointer. Thus a part of the reserved space 32 is used to store the payload data extension. The pointer to the RTP header extensions is also updated to point to the same location as the pointer to the payload data.

The processing modules must be linked sequentially in a data stream manager in order for all the payload data extensions to be inserted into the buffer memory before being able to insert the RTP header and possible extensions to the RTP header. If a processing module is to insert different types of information in a buffer memory, for example an extension to the payload data and an extension to the RTP header, the processing module may be present at different locations in the processing chain.

An example of an extension to the payload data is the OSN (from "original sequence number") retransmission header which must be placed by an RTX source in front of the original payload data when a packet has to be resent, as described in the RFC 4588 section 4 ("RTP Retransmission Payload Format", IETF, RFC 4588, July 2006). Another example is the FEC header and the FEC level header as described in the RFC 5109 section 7 ("RTP Payload Format for Generic Forward Error Correction", IETF, RFC 5109, December 2007).

It is noted that two types of extension are distinguished, the payload data extensions and the extension to the RTP header. The first is described with reference to FIG. 4 whereas the second is described with reference to FIGS. 5 and 6. The addition of extensions to the RTP header is carried out in two phases: a first phase, illustrated in FIG. 5, consists of placing the extensions to the RTP header themselves and a second phase, illustrated in FIG. 6, consists of adding a specific header describing the added extensions to the RTP header and possibly padding.

Figure 5:
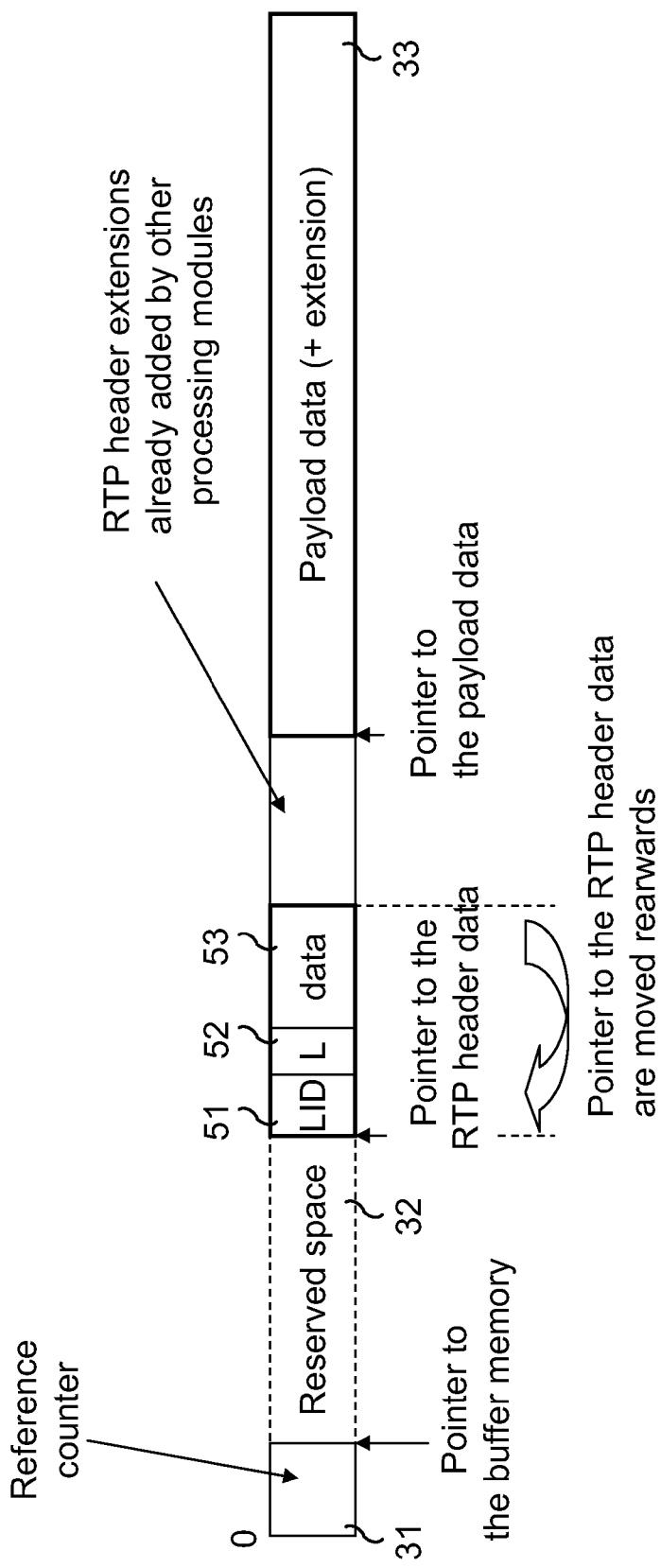
FIG. 5 is a diagram of the content of a buffer memory with another additional content compared to the content presented in FIG. 4.

FIG. 5 represents an addition of an RTP header extension element by a processing module. Each module is able to add additional information to the RTP header. For example, the use of certain services offered by the server 10 may necessitate the sending of additional information with each network packet. This is, for example, the case with the TFRC congestion control service as described in the document "RTP with TCP Friendly Rate Control", IETF, draft-ietf-avt-tfrc-profile-10, July 2007. In this case, this information may be added to an extension to the RTP header as defined by section 5.3.1 of the RFC 3550 ("RTP: A Transport Protocol for Real-Time Applications>>, IETF, RFC3550, July 2003). In order to be able to place several extensions in the RTP header, the different RTP header extensions (which we name "RTP header extension elements") are organized in accordance with RFC 5285 ("A General Mechanism for RTP header Extensions", IETF, RFC 5285, July 2008) which defines how several RTP header extension elements are associated in a packet to form an RTP header extension within the meaning of RFC 3550.

Figure 6:
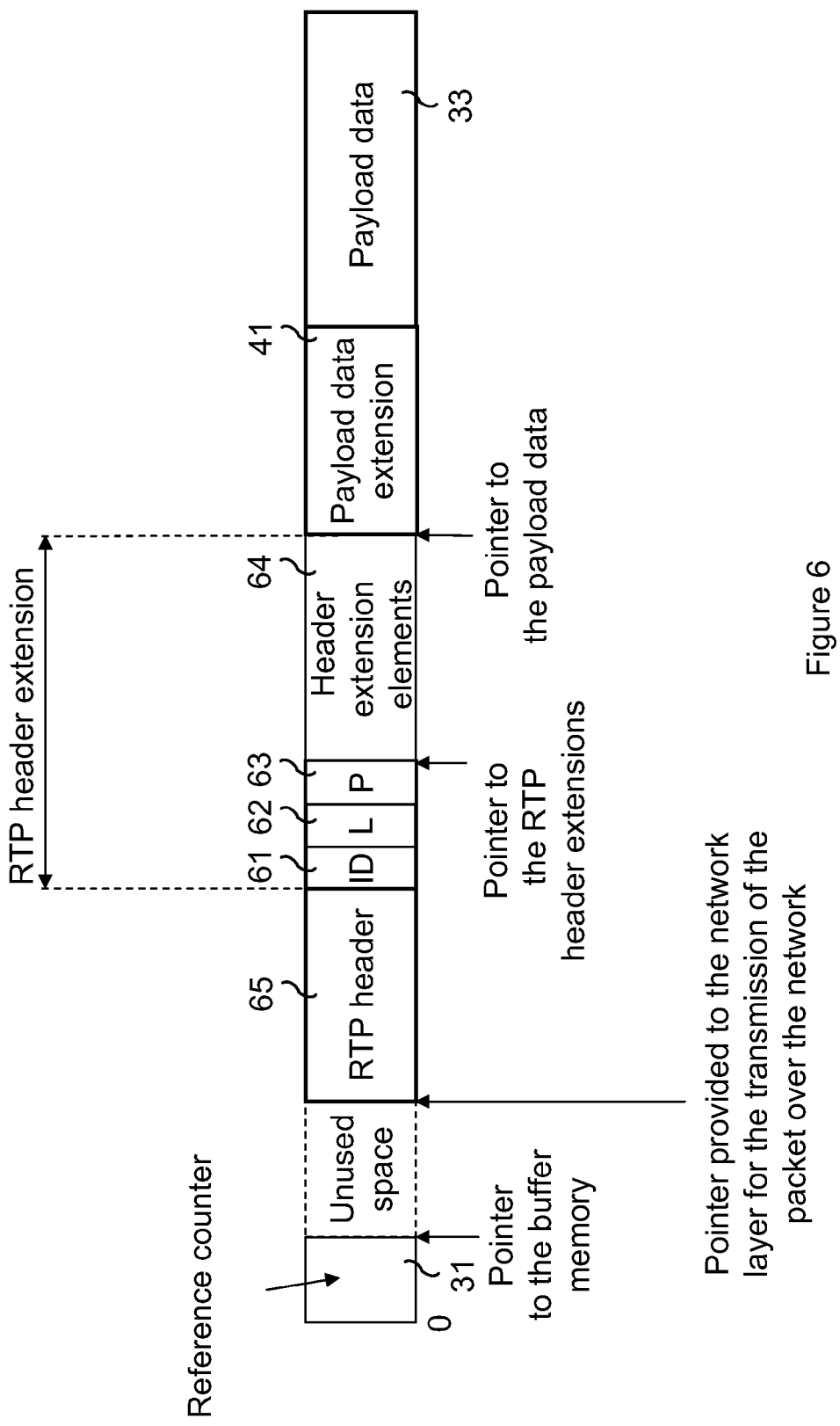
FIG. 6 is a diagram of the content of a buffer memory for finalizing a packet by the addition of an RTP header.

FIGS. 5 and 6 describe the addition of RTP header extension elements. The RTP header extension, illustrated in FIG. 6, is composed of an extension header (composed of the fields ID 61 and L 62) followed by a series of RTP extension elements 64, possibly with a few padding bytes P 63 to ensure the alignment of the data in memory. In some embodiments, each processing module may add additional data to the RTP header. For this, as illustrated in FIG. 5, this processing module subtracts from the pointer to the RTP header extensions the size of the element to add and places the new element at the address so obtained. In accordance with RFC 5285, the element is composed of a local identifier 51, of an indication of length 52 and of the additional data 53.

All the RTP header extension elements are inserted into the buffer memory after the payload data extensions and before the processing by the RTP module which finalizes the RTP packet for transmission over the network.

FIG. 6 describes a network packet as finalized by the RTP processing module.

If RTP header extension elements have been added previously (that is to say if the difference between the pointer to the payload data and the pointer to the RTP header extensions is not zero), the RTP processing module finalizes the RTP packet by first of all determining that the sum of the header extension elements is a multiple of 32 (this is a constraint of the RTP packetization as described in RFC 3550 section 5.3.1). If this is not the case, the RTP processing module adds padding bytes 63 in front of the RTP header extension elements 64. The RTP processing module next adds the header of the RTP extensions composed of an indication of length 62 of the RTP extension elements and of an identifier 61, for example "0xBEDE", in the case of extension elements to the RTP header of one byte size, in accordance with RFC 5285. The RTP processing module next finalizes the packet by adding the RTP header 65.

In the absence of extension elements to the RTP header 64, that is to say if the pointers to the RTP header extensions and to the payload data are equal, the RTP processing module adds an RTP header 65 in front of the pointer to the payload data.

The packet so formed is sent over the network 15.

Figure 7:
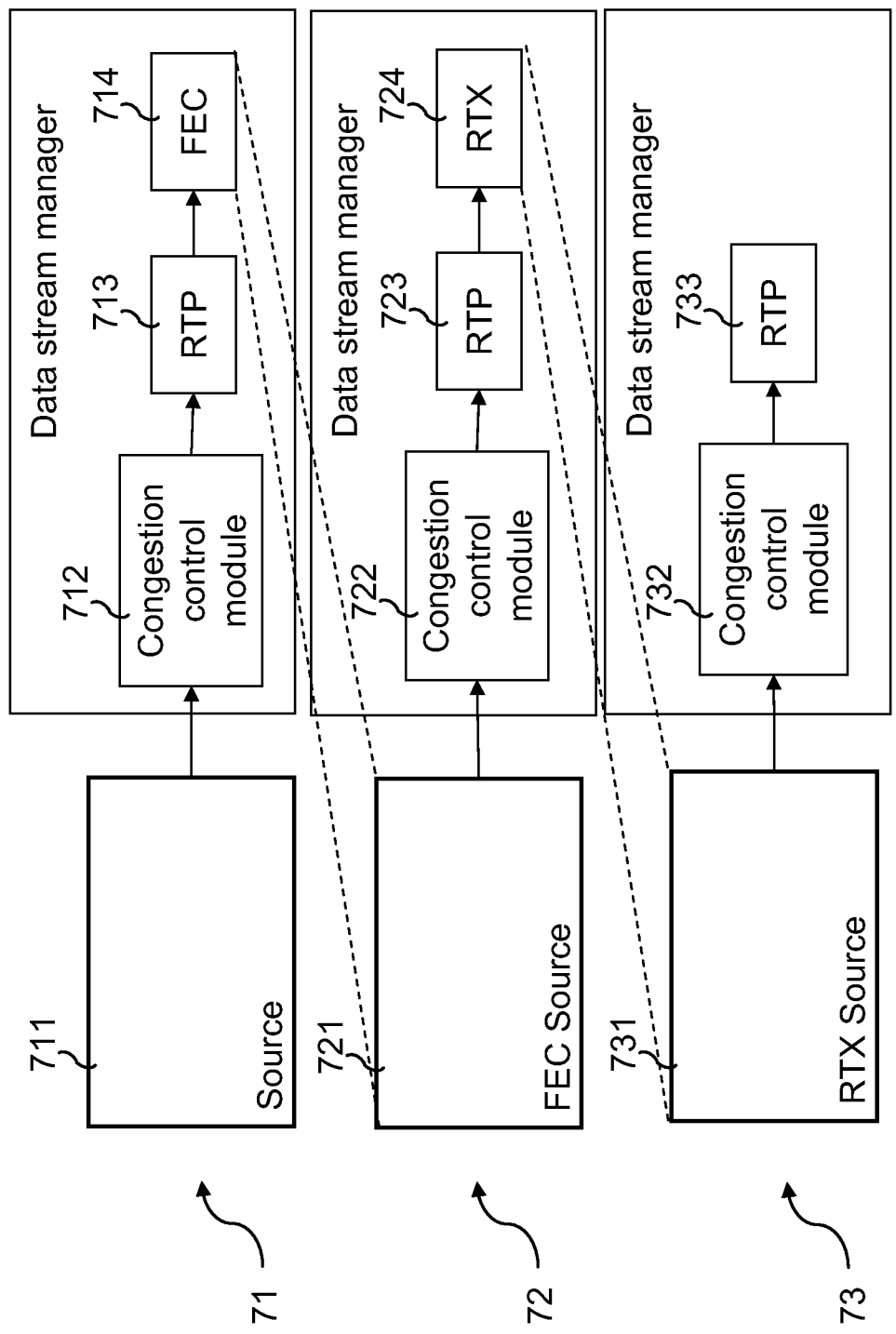
FIG. 7 is a diagram of a first example of a data stream manager and of linking of processing modules.

FIG. 7 gives a first example of a data stream manager and of linking of processing modules. FIG. 7 represents several data streams 71, 72 and 73 destined for the same recipient client and introduces the concept of "persistence" or of "stream dependency" of the additional data and of inheritance between data streams. It is observed that the data streams 71, 72 and 73 are of "dependent" type since the FEC processing module 714 which processes the data stream 71 is, itself, an FEC source 721 for the data stream 72. The retransmission module 724 RTX which manages the data stream 72 is itself an RTX source 731 for the data stream 73. According to this schema, the network packets coming from the data stream 71 are thus protected from packet losses over the network by FEC packets coming from the data stream 72 which are, themselves, protected by retransmission packets coming from the data stream 73. To mark the dependency between the streams, it is stated that the data stream 72 is a "substream" of data of the data stream 71. Similarly, the data stream 73 is a substream of data from the data stream 72.

Generally, when a processing module is itself a source for another data stream, it is said to be a data substream relative to the data stream to which that processing module is linked. The processing module thus inherits the reserved space constraints from the associated data substream.

It is noted that, according to this scheme, each of the data stream managers uses a congestion control service, respectively 712, 722 and 732. Similarly, each data stream manager comprises an RTP module, respectively 713, 723 and 733.

In such a scheme, determination is made of the maximum size of the payload data generated by the source 711 of the data stream 71, in order for each data stream and substream 71, 72 and 73 to be able to transmit its network packets without having to copy or move the data stream once they are have been generated by the source 711 and placed in a buffer memory and without fragmentation of the packets (each packet being equal to one MTU at most).

For this, each processing module determines its maximum requirements for reserved space according to different types of reservation: according to the type of additional information, extension to the payload data or extension to the RTP header, and according to whether the addition of additional information is of persistent nature or not between the dependent streams (that is to say between one data stream and a data substream).

Furthermore, it is a matter of distinguishing whether the additional information added to a data stream by a processing module must be repeated in the data substream or whether the additional information only applies to the data stream to which the processing module is linked.

For example, with reference to FIG. 7, if the congestion control module 712 is of TFRC type, it must add additional information, for example, the date at which the packet was sent or an estimation of the round-trip time (RTT) for a packet, in an RTP header extension. This information is specific to a data stream. It is thus not necessary to repeat this information in a correction substream. It is thus said to be of "datastream dependent" type.

On the contrary, the data stream 72 protects the network packets produced by the data stream 71 by creating and sending FEC packets from original packets of the data stream 71. For this, the FEC packets are produced by the processing module 714/FEC source 721 by adding, among others, an FEC header to the payload data or equivalents. Furthermore, the FEC data stream 72 is itself protected by a retransmission data stream 73. For this the retransmission packets are produced by the RTX source 731 on the basis of the FEC packets saved by the RTX processing module 724. That is to say that the retransmitted packets integrate, at the same time, the equivalent of the payload data and the FEC header of the payload data. The FEC header is thus of "persistent" type.

It is noted that the headers added by the FEC source 721 and the RTX source 731 here are of an additive character: a packet retransmitted by the stream 73 integrates, at the same time, the equivalent of the original payload data of the data stream 71, the FEC header of the payload data of the data stream 72, the RTX header of the payload data of the data stream 73 and an extension to the RTP header for the congestion control service.

The following different types of reservation are thus distinguished:
- persistent RTP header extensions (or PHEs from "Persistent Header Extension"),
- the stream-dependent RTP header extensions (or SDHEs from Stream-Dependent Header Extension),
- the persistent payload data extensions (or PPEs from "Persistent Payload Extension"),
- the stream-dependent payload data extensions (or SPDEs, from Stream-Dependent Payload Extension).

Figure 8:
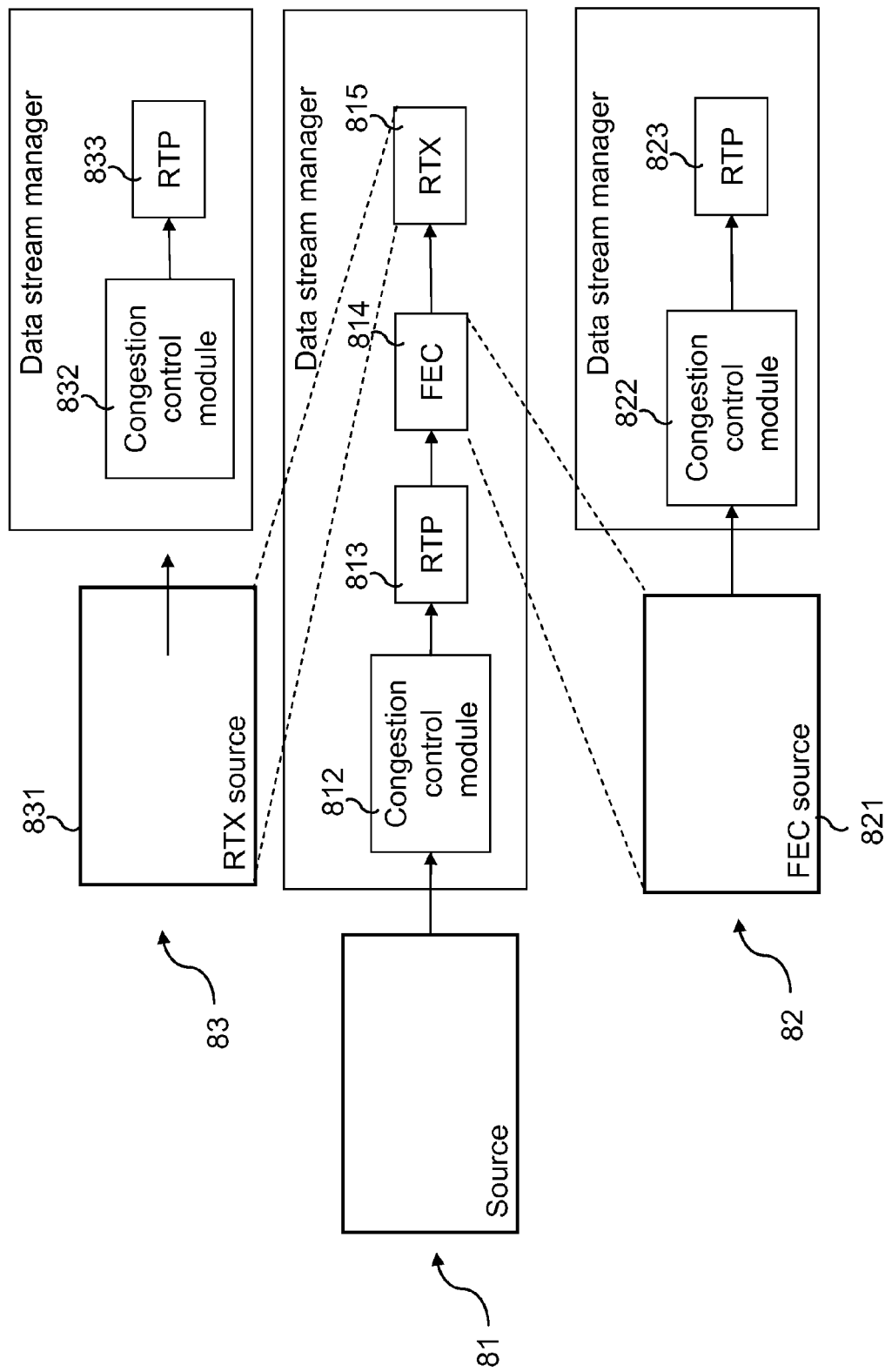
FIG. 8 is a diagram of a second example of a data stream manager and of linking of processing modules.

FIG. 8 shows a second example of data streams and of linking of processing modules, Here, the data streams 81, 82 and 83 are addressed to the same recipient client. According to this scheme, the network packets coming from the data stream 81 may be protected both by FEC packets coming from the data substream 82 and by RTX retransmission packets coming from the data substream 83.

Furthermore, each of data stream 81 and substreams 82 and 83 uses a congestion control service, respectively 812, 822 and 832.

The data stream manager 81 receives data from a source 811 and comprises the congestion control module 812, an RTP module 813, an FEC module 814 and a retransmission module 815. The data stream manager 82 comprises the congestion control module 822 and an RTP module 823. The data stream manager 83 comprises the congestion control module 832 and an RTP module 833. Contrary to the case illustrated in FIG. 7, the payload data headers added by the FEC source 821 or the RTX source 831 are not of additive character here.

Figure 9:
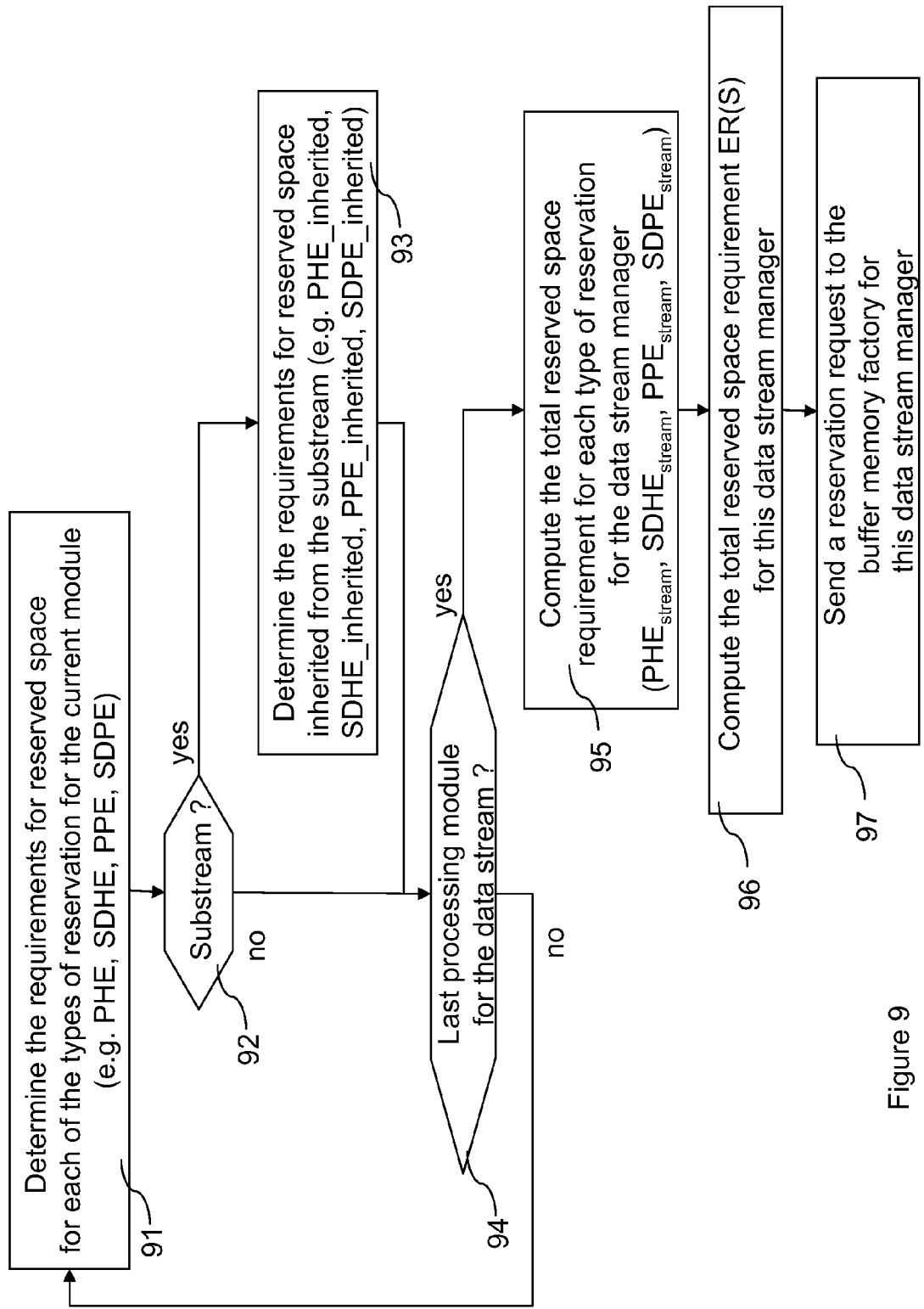
FIG. 9 is a flow-diagram representation of the steps implemented in a first particular embodiment of the method provided by the present invention for computing the maximum size of the space reserved for a data stream.

FIG. 9 shows a flow diagram of steps for computing the maximum size of the space reserved in a buffer memory by a data stream manager for transporting a data stream which may comprise at least one substream.

The reservation request by a data stream manager is re-estimated at each of the following events:
- a client connects to the system,
- a client disconnects from the system,
- a client activates a service or
- a client deactivates a service.

To determine the size of the reserved space required by a data stream manager, the reservation requirements according to the types PHE, SDHE, PPE and SDPE must be determined for each processing module starting by a first module, during a step 91. This determination of reservation requirements is detailed later.

During a step 92, it is determined whether the processing module is itself a source of data for at least one substream. If yes, during a step 93, the processing module determines the reservation requirements of each substream, also according to the types PHE, SDHE, PPE, SDPE. These reservation requirements are said to be "inherited".

Otherwise, or after step 93, during a step 94, the data stream manager determines whether the reservation requirement of the last processing module of the data stream manager has been determined. If not, step 91 is returned to in order to process a new processing module of the data stream manager.

If the last module has been processed, during a step 95, the data stream manager (denoted "S") determines its reservation requirements (denoted "R") by taking into account the processing modules which compose it (denoted $M_i$) and the substreams that it inherits (denoted "$S_j$") according to the following formulae:

$$R^{PHE}(S) = \sum_i^{processing\ modules} R^{PHE}(M_i) + \max_j^{Substreams}(R^{PHE}(S_j)) \quad (1)$$

$$R^{SDHE}(S) = \max\left(\sum_i^{processing\ modules} R^{SDHE}(M_i), \max_j^{Substreams}(R^{SDHE}(S_j))\right) \quad (2)$$

$$R^{PPE}(S) = \sum_i^{processing\ modules} R^{PPE}(M_i) + \max_j^{Substreams}(R^{PPE}(S_j)) \text{et} \quad (3)$$

$$R^{SDPE}(S) = \max\left(\sum_i^{processing\ modules} R^{SDPE}(M_i), \max_j^{Substreams}(R^{SDPE}(S_j))\right) \quad (4)$$

These equations may be expressed in the form of operations which depend on the type of extension information. The reserved space "$R^E(S)$" required to store a given type of extension information E for a data stream manager S may be expressed as a function of the spaced reserved by the modules $M_i$ which compose it (denoted $R^E(M_i)$) and of the space reserved by the substreams $S_j$ that it inherits (denoted $R^E(S_j)$) in the form $$R^E(S) = O^E\left(\sum_{M_i}^{processing\ modules} R^E(M_i), \max_{S_j}^{Substreams}(R^E(S_j))\right) \quad (5)$$

The equations (1) to (4) given earlier are thus expressed in the form of a single equation $R^E(S)$, where "E" designates the type of extension information, that is to say one of the types PHE, SDHE, PPE or SDPE, and $O^E$ designates an operation depend on the type E, with $O^{SDHE}$ and $O^{SDPE}$ corresponding to the operation "max" which extracts the maximum value of a pair of values and $O^{PHE}$ and $O^{PPE}$ correspond to the operation "+" which adds the values of the pair of values.

$R^E(M_i)$ represents the reserved space for a type of reservation E by one of the processing modules denoted $M_i$ of the data stream manager S. $R^E(S_j)$ represents the reserved space for a type of reservation E by one of the data substreams denoted $S_j$ of the data stream manager S.

Once the reservation requirements of the different types have been determined for a data stream, determination is made during a step 96 of the size of total space "ER" reserved for that data stream S using the following equation:

$$ER(S) = \text{align}_{32}(R^{PHE}(S) + R^{SDHE}(S) + HDR) + R^{PPE}(S) + R^{SDPE}(S)$$

in which equation "HDR" is the size of the header of the RTP header extensions as defined in RFC 5285 and in FIG. 6, the RTP header 65 and "$\text{align}_{32}(x)$" represents the alignment of the value x with the multiple of 32 bits above, i.e. four bytes in practice, since the value x is expressed in bytes.

The data stream manager may then record its requirement for reserved space thus computed, at the buffer memory factory of the source to which it is linked, during a step 97.

It is noted that the data stream manager may pre-record the data stream from the buffer memory factory by sending a reservation request equal to "0".

Figure 10:
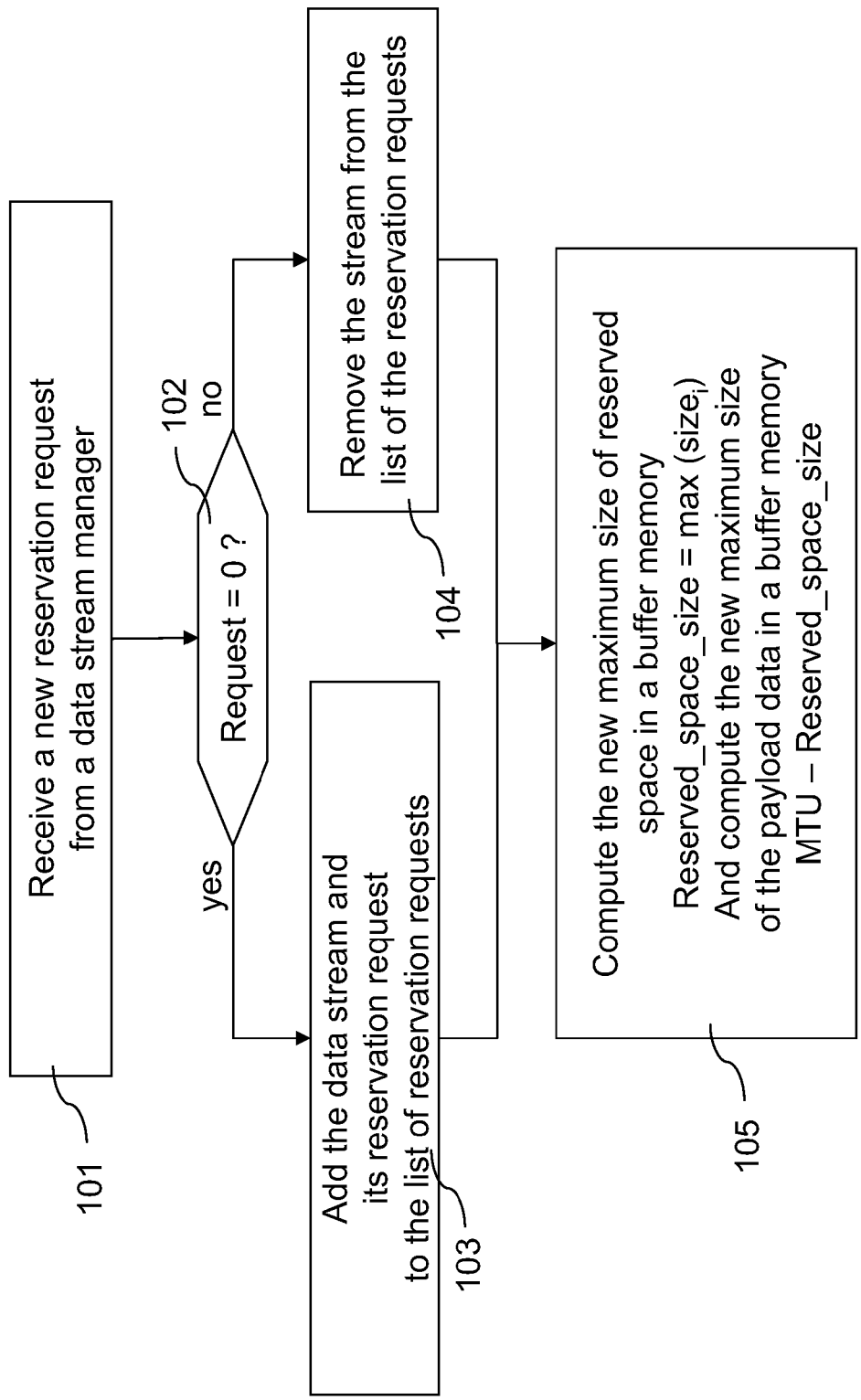
FIG. 10 represents, in the form of a flow diagram, steps implemented for computing the maximum size of the payload data by a buffer factory

FIG. 10 represents a flow diagram of steps for the computation of the maximum size of the payload data performed by the buffer memory factory. FIG. 10 thus details the steps carried out by the buffer memory factory on reception of a request for reservation from a data stream manager, during a step 101. During a step 102, it is determined whether the request for reservation is equal to "0".

If yes, during a step 103, the data stream and its request for reservation are added to the list of the reservation requests. Otherwise, the data stream is withdrawn from the list of the reservation requests, during a step 104.

Further to one of the steps 103 or 104, the memory factory has all the reservations of each of the data stream managers that are linked to it. During a step 105, the buffer memory factory determines the maximum size of the payload data which it will be possible to send by the all the data stream managers, by subtracting the maximum value of the reservation requests from the maximum size (in bytes) of the packet that can be sent at one time (without fragmentation) over the network, MTU.

Figure 11:
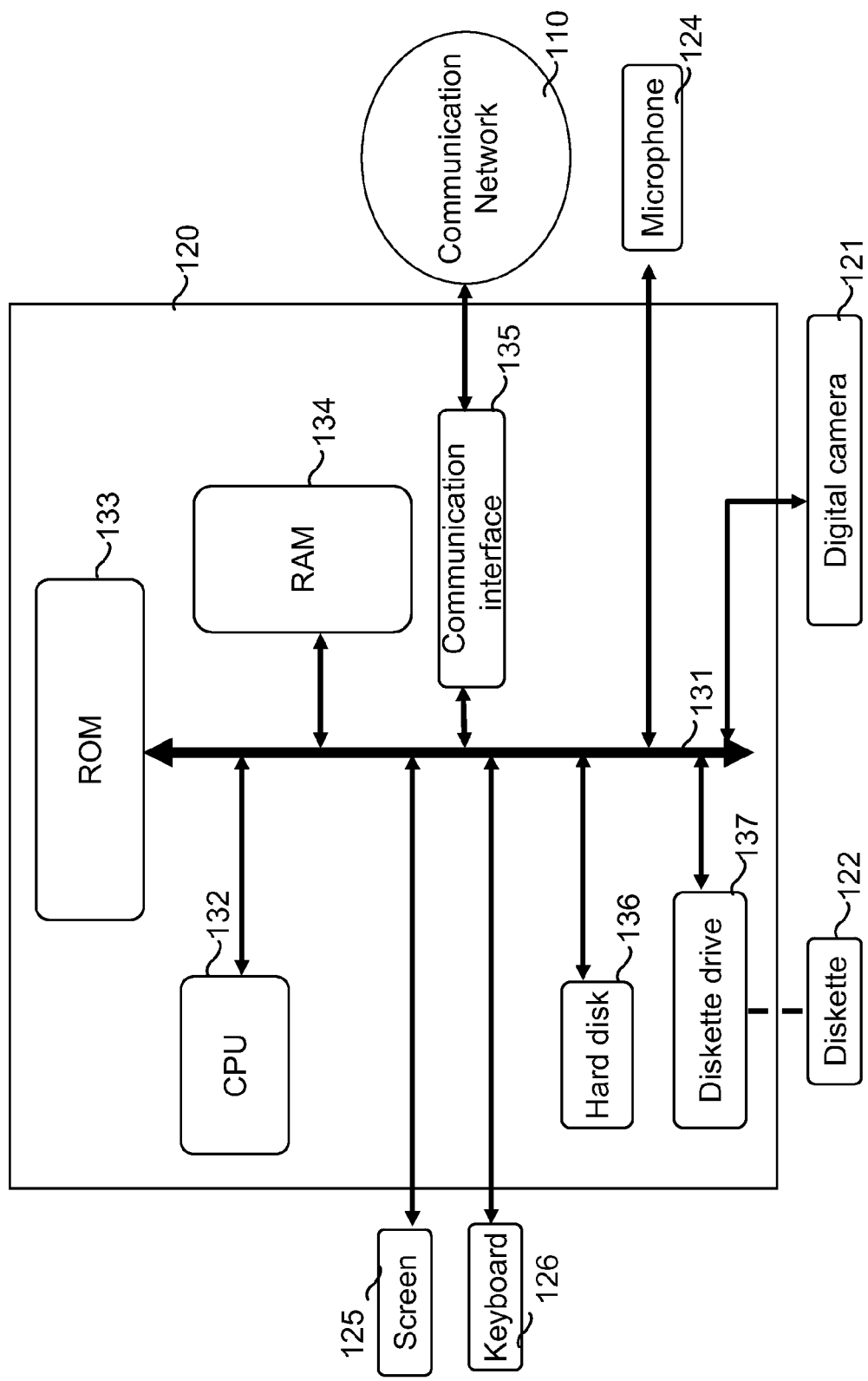
FIG. 11 is a diagram of a particular embodiment of the device of the present invention.

The embodiment of the device of the present invention illustrated in FIG. 11 is based, for example, on an apparatus 120, for example a micro-computer, a work station, a personal digital assistant, a mobile telephone, a network moving picture camera, a stills camera, a television, a camcorder or, more generally, any peripheral (whether mobile or not) provided with a communication interface enabling its connection to a wireless or wired network 110. This apparatus 120 may be connected to different peripheral devices, such as a digital moving picture camera 121 (or a scanner, or any other means of image acquisition or storage) connected to an input/output card (not shown) and providing the apparatus 120 with multimedia data.

The apparatus 120 comprises a communication bus 131 to which there are connected:

a central processing unit 132 (microprocessor) (denoted "CPU" in FIG. 2), a read only memory 133, removable or not, storing executable programs the instructions of which are readable by a processor or a computer and which enable the implementation of the method of the present invention, a random access memory 134, which, after powering up, contains the executable code implementing the method of the present invention as well as registers adapted to record values of variables and parameters necessary for the implementation of that method;

a communication interface 135 connected to the telecommunications network 110, the interface 135 being adapted to transmit and receive data.

Optionally, the apparatus 120 may also have:

in the case of audio data, an input/output card (not shown) connected to a microphone 124, a screen 125 for viewing data and/or serving as a graphical interface with the user, who may interact with the programs, using a keyboard 126 supplemented or not by any other means such as a pointing device, for example a mouse, an optical stylus, or a touch screen (not shown).

a hard disk or a storage memory, such as a compact flash card, 136 able to store the programs and the data used or produced on implementation of the invention.

a diskette drive (or any other removable data medium) 137 adapted to receive a diskette 122 and to read or write thereon data processed or to be processed according to the invention.

A communication bus 131 affords communication and interoperability between the different elements included in the apparatus 120 or connected to it. The representation of the bus 131 is non-limiting and, in particular, the central processing unit 132 is capable of communicating instructions to any element of the apparatus 120 directly or by means of another element of the apparatus 120.

The diskettes 122 can be replaced by any information carrier such as a compact disc (CD-ROM) rewritable or not, a ZIP disk or a memory card. Generally, an information storage means, which can be read by a micro-computer or microprocessor, integrated or not into the device, and which may possibly be removable, is adapted to store one or more programs the execution of the instructions of which permits the implementation of the method of the present invention.

The executable code enabling the implementation of the method of the present invention by the apparatus 120 may equally well be stored in read only memory 133, on the hard disk 136 or on a removable digital medium such as a diskette 122. According to a variant, the executable code of the programs is received by the intermediary of the communications network 110, via the interface 135, to be stored in one of the storage means of the apparatus 120 before being executed.

The central processing unit 132 controls and directs the execution of the instructions of portions of software code of the program or programs. On powering up, the program or programs which are stored in a non-volatile memory, for example the hard disk 136 or the read only memory 133, are transferred into the random access memory 134 (RAM), which will then contain the executable code of the program or programs according to the invention, as well as registers for storing the variables and parameters necessary for the implementation of the invention.

It is to be noted that the apparatus 120 comprising the device according to the invention can also be a programmed apparatus. This apparatus 120 then contains the code of the computer program or programs, for example, fixed in an application specific integrated circuit (or "ASIC").

On reading the above it is understood that the invention makes it possible to manage different types of additional information that come to be added to the payload data on generation of a network packet, for example the headers of payload data ("payload header") of persistent or data stream dependent type, the Basic RTP header extensions of persistent or purely data stream dependent type and the headers of fixed size (for example, the Basic RTP headers).

Furthermore, the available size for the payload data in a network packet is always optimum. It is re-estimated each time a client connects or disconnects to or from the system and on each activation or deactivation of a service by one of the clients.

Lastly, the payload data are never duplicated/copied, even if they are sent to several recipients (multi-cast case) or if they are to be retransmitted several times to the same client. The system thus consumes less memory resource and processor resource.

What is claimed is:

1. A method, executed by a processor of an information processing apparatus, of determining the available space in a packet for data stream transport, comprising:
   a step of determining the requirements of each module of a data stream manager, for space in the packet for at least two types of header and/or extension data required by each protocol and/or service used by said module,
   a step of determining a maximum space requirement in the packet to meet all the determined requirements, by implementing different rules for combining space requirements for the different types of data and a sum of the combined requirements for the different types of data and
   a step of computing a difference between the space of the packet and the maximum space requirement in the packet in order to determine the available space for data stream transport,
   wherein, during the step of determining the requirements of each module for space in the packet for at least two types of data, the types comprise at least one persistent type and at least one data stream dependent type.

2. A method according to claim 1, further comprising:
   a step of detecting an event from among the following:
      arrival of a recipient client of the data stream in a network for transmitting said data stream,
      departure of a recipient client of the data stream from the network,
      activation of at least one module of the data stream manager, and
      deactivation of at least one module of the data stream manager; and
   a step of determining the data stream manager concerned by said event, said data stream manager performing the steps of determining the requirements and of computing.

3. A method according to claim 1, in which, during the step of determining the requirements of each module for space in the packet for at least two types of data, the types comprise:
   at least one of the following types:
      persistent RTP header extension (PHE), and
      persistent payload data extension (PPE); and
   at least one of the following types:
      data stream dependent RTP header extension (SDHE), and
      data stream dependent payload data extension (SDPE).

4. A method according to claim 3, in which, during the step of determining a maximum space requirement in the packet to meet all of the determined requirements, there is implemented:
   for the combination of persistent extension type space requirements, a requirement adding operation, and
   for the combination of space requirements of data stream dependent type, a maximum requirement value extracting operation.

5. A method according to claim 1, in which, during the step of determining the requirements of each module, if said module is a source of a substream of the data stream, the space requirement of the packet is determined for at least two types of data of the substream.

6. A method according to claim 5, in which, during the step of determining a maximum space requirement in the packet to meet all of the determined requirements, for all the substreams of said data stream, an operation is implemented of extracting the maximum value of the requirements for the substreams for each type of data.

7. A method according to any one of claim 5 or 6, in which, during the step of determining a maximum space requirement in the packet to meet all of the determined requirements R, the following equations are implemented for the set of the modules $M_i$ which compose the manager of stream S and substreams $S_j$ inherited by the stream manager:
   for the persistent header extensions PHE:

$$R^{PHE}(S) = \sum_{i}^{processing\ modules} R^{PHE}(M_i) + \max_{j}^{substream}(R^{PHE}(S_j)),$$

for the data stream dependent header extensions SDHE:

$$R^{SDHE}(S) = \max\left(\sum_{i}^{processing\ modules} R^{SDHE}(M_i), \max_{j}^{substream}(R^{SDHE}(S_j))\right),$$

for the persistent payload data extensions PPE:

$$R^{PPE}(S) = \sum_{i}^{processing\ modules} R^{PPE}(M_i) + \max_{j}^{substream}(R^{PPE}(S_j)),$$

and
   for the data stream dependent payload data extensions SDPE, $$R^{SDPE}(S) = \max\left(\sum_{i}^{processing\ modules} R^{SDPE}(M_i), \max_{j}^{substream}(R^{SDPE}(S_j))\right),$$

and
   next, to compute the total requirement $R^E(S)$, $$R^E(S) = O^E\left(\sum_{M_i}^{processing\ modules} R^E(M_i), \max_{S_j}^{substream}(R^E(S_j))\right),$$

in which equation "E" designates the type of extension information from one of the types PHE, SDHE, PPE or SDPE, and $O^E$ designates an operation dependent on the type E with:

$O^{SDHE}$ and $O^{SDPE}$ corresponding to the operation "max" which extracts the maximum value of a pair of values, and $O^{PHE}$ and $O^{PPE}$ correspond to the operation "+" which adds the values of the pair of values.

8. A method according to claim 1, further comprising a step of reserving packet space at a buffer memory factory linked to the source of the stream considered, by indicating the result of the difference computing step, and a step of computing, by the factory, the maximum of the requests for space reservation so as to yield a buffer memory, on request for a new buffer memory for placing therein new data from the stream, with a pointer to the location starting from which the data from the stream may be placed as a function of the maximum of the requests for reservation of space at the buffer memory beginning.

9. A method according to claim 8, which comprises, for each item of data of the data stream:
 a single step of writing said item of data in the buffer memory, after said pointer, and
 for each transmission of said item of data to a recipient, a step of writing header and/or extension data for each module of the data stream manager that is associated with said transmission.

10. A method according to any of claims 1, 8 and 9, which comprises a step of transmitting data from the stream according to RTP ("Real-time Transport Protocol").

11. A method according to claim 1, comprising a step of transmitting a first packet including data from the stream and a header and/or extension data according to one of said two types.

12. A method according to claim 11, comprising a step of transmitting a second packet including said data from the stream and a header and/or extension data according to the other one of said two types.

13. A device for computing the available space in a packet for data stream transport, which comprises:
 a means for determining the requirements of each module of a data stream manager, for space in the packet for at least two types of header and/or extension data required by each protocol and/or service used by said module,
 a means for determining a maximum space requirement in the packet to meet all of the determined requirements, by implementing different rules for combining space requirements for the different types of data and a sum of the combined requirements for the different types of data; and
 a means for computing a difference between the space of the packet and the maximum space requirement in the packet in order to determine the available space for data stream transport,
 wherein, during the step of determining the requirements of each module for space in the packet for at least two types of data, the types comprise at least one persistent type and at least one data stream dependent type.

14. A non-transitory computer readable storage medium on which is stored computer executable code of a computer program that can be loaded into a computer system, said program containing instructions enabling the implementation of the method according to claim 1.

* * * * *